US005817925A

United States Patent [19]

Cook et al.

[11] Patent Number: 5,817,925

[45] Date of Patent: Oct. 6, 1998

[54] EVAPORATIVE EMISSION LEAK DETECTION SYSTEM

[75] Inventors: John E. Cook; Paul D. Perry; Paul V. Terek, all of Chatham, Canada

[73] Assignee: Siemens Electric Limited, Mississauga, Canada

[21] Appl. No.: 824,938

[22] Filed: Mar. 26, 1997

[51] Int. Cl.[6] .............................. F02M 37/04; G01M 3/20

[52] U.S. Cl. .............................. 73/40; 73/49.7; 123/520

[58] Field of Search ....................... 73/40, 49.7; 123/518, 123/519, 520

[56] References Cited

U.S. PATENT DOCUMENTS

| | | | |
|---|---|---|---|
| 5,146,902 | 9/1992 | Cook et al. | 123/520 X |
| 5,297,529 | 3/1994 | Cook et al. | 123/520 |
| 5,383,437 | 1/1995 | Cook et al. | 123/520 |
| 5,390,645 | 2/1995 | Cook et al. | 123/520 |
| 5,411,004 | 5/1995 | Busato et al. | 123/520 |
| 5,474,050 | 12/1995 | Cook et al. | 123/520 |
| 5,483,942 | 1/1996 | Perry et al. | 123/520 |
| 5,499,614 | 3/1996 | Busato et al. | 123/520 |
| 5,606,121 | 2/1997 | Blomquist et al. | 73/49.7 X |
| 5,635,630 | 6/1997 | Dawson et al. | 123/520 X |
| 5,651,350 | 7/1997 | Blomquist et al. | 123/520 |
| 5,685,279 | 11/1997 | Blomquist et al. | 123/520 |

*Primary Examiner*—Hezron E. Williams
*Assistant Examiner*—Daniel S. Larkin

[57] ABSTRACT

An on-board diagnostic system for an evaporative emission control system of an internal combustion engine powered vehicle employs a leak detection module that is fluid connected in a vent passage for the evaporative emission space. The leak detection module contains an electric motor driven impeller, a solenoid operated valve assembly that is selectively operable to three positions, and a pressure-responsive switch whose switching characteristic possesses hysteresis corresponding to an upper regulating limit and a lower regulating limit. The valve assembly operates to allow the prime mover to pump gaseous fluid with respect to the evaporative emission space to attain a test pressure in the evaporative emission space corresponding to the upper regulating limit, to close the evaporative emission space and prevent the prime mover from pumping gaseous fluid with respect to the evaporative emission space upon initially attaining the upper regulating limit test pressure within the evaporative emission space, and which allows the prime mover to pump gaseous fluid with respect to the evaporative emission space at a pre-defined volumetric flow rate to rebuild pressure in the evaporative emission space to the upper regulating limit when the pressure has changed to the lower regulating limit due to a leak in the evaporative emission space.

27 Claims, 5 Drawing Sheets

EVAPORATIVE EMISSION LEAK DETECTION SYSTEM

REFERENCE TO RELATED APPLICATIONS

This application is related to commonly owned copending patent applications Ser. No. 08/798,818 filed on or about 12 Feb. 1997 (Attorney Docket 97P7652US) and Ser. No. 08/798,819, filed on or about 12 Feb. 1997 (Attorney Docket 97P7653US).

FIELD OF THE INVENTION

This invention relates generally to an on-board system for detecting fuel vapor leakage from an evaporative emission control system of an automotive vehicle.

BACKGROUND AND SUMMARY OF THE INVENTION

A known on-board evaporative emission control system for an automotive vehicle comprises a vapor collection canister that collects volatile fuel vapors generated in the headspace of the fuel tank by the volatilization of liquid fuel in the tank and a purge valve for periodically purging fuel vapors to an intake manifold of the engine. A known type of purge valve, sometimes called a canister purge solenoid (or CPS) valve, comprises a solenoid actuator that is under the control of a microprocessor-based engine management system, sometimes referred to by various names, such as an engine management computer or an engine electronic control unit.

During conditions conducive to purging, evaporative emission space that is cooperatively defined primarily by the tank headspace and the canister is purged to the engine intake manifold through the canister purge valve. A CPS-type valve is opened by a signal from the engine management computer in an amount that allows intake manifold vacuum to draw fuel vapors that are present in the tank headspace and/or stored in the canister for entrainment with combustible mixture passing into the engine's combustion chamber space at a rate consistent with engine operation so as to provide both acceptable vehicle driveability and an acceptable level of exhaust emissions.

Certain governmental regulations require that certain automotive vehicles powered by internal combustion engines which operate on volatile fuels such as gasoline, have evaporative emission control systems equipped with an on-board diagnostic capability for determining if a leak is present in the evaporative emission space. It has heretofore been proposed to make such a determination by temporarily creating a pressure condition in the evaporative emission space which is substantially different from the ambient atmospheric pressure, and then watching for a change in that substantially different pressure which is indicative of a leak.

It is believed fair to say that there are two basic types of diagnostic systems and methods for determining integrity of an evaporative emission space against leakage.

Commonly owned U.S. Pat. No. 5,146,902 "Positive Pressure Canister Purge System Integrity Confirmation" discloses one type: namely, a system and method for making a leakage determination by pressurizing the evaporative emission space to a certain positive pressure therein (the word "positive" meaning relative to ambient atmospheric pressure) and then watching for a drop in positive pressure indicative of a leak.

Commonly owned U.S. Pat. No. 5,383,437 discloses the use of a reciprocating pump to create test pressure in the evaporative emission space and a switch that is responsive to reciprocation of the pump mechanism. More specifically, the pump comprises a movable wall that is reciprocated over a cycle which comprises an intake stroke and a compression stroke to create pressure in the evaporative emission space. On an intake stroke, a charge of atmospheric air is drawn in an air pumping chamber space of the pump. On an ensuing compression stroke, the movable wall is urged by a mechanical spring to compress a charge of air so that a portion of the compressed air charge is forced into the evaporative emission space. On a following intake stroke, another charge of atmospheric air is drawn in the air pumping chamber space.

At the beginning of an integrity confirmation procedure, the pump reciprocates rapidly, seeking to build pressure toward a predetermined level. If a gross leak is present, the pump will be incapable of pressurizing the evaporative emission space to the predetermined level, and hence will keep reciprocating rapidly. Accordingly, continuing rapid reciprocation of the pump beyond a time by which predetermined test pressure should have been reached, will indicate the presence of a gross leak, and the evaporative emission control system may therefore be deemed to lack integrity.

The pressure which the pump strives to achieve is set essentially by its aforementioned mechanical spring. In the absence of a gross leak, the pressure will build toward a predetermined test pressure, and the rate of reciprocation will correspondingly diminish. For a theoretical condition of zero leakage, the reciprocation will cease at a point where the spring is incapable of forcing any more air into the evaporative emission space.

Leaks smaller than a gross leak are detected in a manner that is capable of giving a measurement of the effective orifice size of leakage, and consequently the arrangement is capable of distinguishing between very small leakage which may be deemed acceptable and somewhat larger leakage which, although considered less than a gross leak, may nevertheless be deemed unacceptable. The ability to provide some measurement of the effective orifice size of leakage that is smaller than a gross leak, rather than just distinguishing between integrity and non-integrity, may be considered important for certain automotive vehicles.

The means for obtaining the pressure measurement comprises the aforementioned switch (a reed switch, for example) which, as an integral component of the pump, is disposed to sense reciprocation of the pump mechanism. The switch serves both to cause the pump mechanism to reciprocate at the end of a compression stroke and as an indication of how fast air is being pumped into the evaporative emission space. Since the rate of pump reciprocation will begin to decrease as the pressure begins to build, detection of the rate of switch operation can be used in the first instance to determine whether or not a gross leak is present. As explained above, a gross leak is indicated by failure of the rate of switch operation to fall below a certain frequency within a certain amount of time. In the absence of a gross leak, the frequency of switch operation provides a measurement of leakage that can be used to distinguish between integrity and non-integrity of the evaporative emission space. Once the evaporative emission space pressure has built substantially to the predetermined pressure, the switch's indication of a pump reciprocation rate less than a certain frequency will indicate integrity of the evaporative emission space while indication of a greater frequency will indicate non-integrity. The pump is also used to perform flow confirmation that would confirm the absence of blockage in the purge flow conduits.

Commonly owned U.S. Pat. No. 5,474,050 embodies advantages of the pump of U.S. Pat. No. 5,383,437 while providing certain improvements in the organization and arrangement of that general type of pump. More specifically, the pump of U.S. Pat. No. 5,474,050: enables integrity confirmation to be made while the engine is running; enables integrity confirmation to be made over a wide range of fuel tank fills between full and empty so that the procedure is for the most part independent of tank size and fill level; provides a procedure that is largely independent of the particular type of volatile fuel being used; provides the pump with novel internal valving for selectively communicating the air pumping chamber space, a first port leading to the evaporative emission space, and a second port leading to atmosphere; and provides a reliable, cost-effective means for compliance with on-board diagnostic requirements for assuring leakage integrity of an evaporative emission control system.

The other of the two general types of systems for making a leakage determination does so by creating in the evaporative emission space a certain negative pressure (the word "negative" meaning relative to ambient atmospheric pressure so as to denote vacuum) and then watching for a loss of vacuum indicative of a leak. A known procedure employed by this latter type of system in connection with a diagnostic test comprises utilizing engine manifold vacuum to create vacuum in the evaporative emission space. Because that space may, at certain non-test times, be vented through the canister to allow vapors to be efficiently purged when the CPS valve is opened for purging fuel vapors from the tank headspace and canister, it is known to communicate the canister vent port to atmosphere through a vent valve that is open when vapors are being purged to the engine, but that closes preparatory to a diagnostic test so that a desired test vacuum can be drawn in the evaporative emission space for the test. Once a desired vacuum has been drawn, the purge valve is closed, and leakage appears as a loss of vacuum during the length of the test time after the purge valve has been operated closed.

In order for an engine management computer to ascertain when a desired vacuum has been drawn so that it can command the purge valve to close, and for loss of vacuum to thereafter be detected, it is known to employ an electric sensor, or transducer, that measures negative pressure, i.e. vacuum, in the evaporative emission space by supplying a measurement signal to the engine management computer. It is known to mount such a sensor on the vehicle's fuel tank where it will be exposed to the tank headspace. For example, commonly owned U.S. Pat. No. 5,267,470 discloses a pressure sensor mounting in conjunction with a fuel tank rollover valve.

In one respect, the invention of the present patent application is directed to a novel system for testing the integrity of an evaporative emission control system against leakage that is adaptable to either of the two aforementioned basic types of systems.

Commonly owned co-pending application Ser. No. 08/798,819, filed on or about 12 Feb. 1997 (Attorney Docket 97P7653US) discloses a novel system and method that provides a time-based measurement of multiple events relating to the direct regulation of evaporative emission space test pressure, either positive or negative depending on which one of the two basic systems and methods is employed, between an upper regulating limit (URL) and a lower regulating limit (LRL). Stated another way, that system and method provides a time-based measurement of multiple events derived from an actual gas flow volume through a defined flow path substantially equal to a corresponding gas volume that has flowed through one or more leak paths in the evaporative emission space.

As a result, a system and method embodying the principles of the invention of commonly owned co-pending patent application Ser. No. 08/798,819, (Attorney Docket 97P7653US) is believed to be more insensitive to sporadic transient events that could otherwise impair test accuracy. It is also believed to be more insensitive to other influences, such as the amount of liquid fuel in the tank when a test is being performed. By providing improved accuracy, the time-based measurement of multiple events can serve to reduce the likelihood of a false indication of a leak.

Moreover, that system and method can serve to perform both a "gross leak" test and a "pinched-line" test, as well as a measurement of the size of a leak.

The invention which is the subject of the present patent application relates in one respect to new and unique apparatus for practicing the method which is the subject of commonly owned co-pending patent application Ser. No. 08/798,819, (Attorney Docket 97P7653US).

Speaking generally in one respect, the present invention relates to an engine-powered automotive vehicle evaporative emission control system comprising an evaporative emission space for containing volatile fuel vapors, and a leak detection system for detecting leakage from the evaporative emission space, wherein the leak detection system comprises: a prime mover for pumping gaseous fluid with respect to the evaporative emission space; a selectively operable valve assembly which operates to a first condition for allowing the prime mover to pump gaseous fluid with respect to the evaporative emission space, which operates to a second condition for closing the evaporative emission space upon attainment of an initial test pressure within the evaporative emission space that differs sufficiently from atmospheric pressure to allow a leak in the evaporative emission space to be detected, and which operates to a third condition different from its first and second conditions; a control, including a pressure-responsive electric device, for controlling operation of the prime mover and the valve assembly; wherein the pressure-responsive electric device is disposed to provide an electric signal related to pressure in the evaporative emission space; wherein the pressure-responsive electric device allows the valve assembly to assume its first condition while the prime mover is operated to pressurize the evaporative emission space to an initial test pressure at the beginning of a test; wherein a signal from the pressure-responsive device causes the valve assembly to assume its second condition upon attainment of the initial test pressure; and wherein a signal from the pressure-responsive device causes the valve assembly to assume its third condition when the initial test pressure has changed by a pre-defined amount due to a leak in the evaporative emission space.

The electric pressure-responsive device supplies a pressure feedback signal to a control computer, such as an engine management computer, and that signal is related to pressure in the evaporative emission space under test. The computer processes pressure information to control both the prime mover and the electric-operated valve mechanism.

The disclosed presently preferred embodiment of the invention is illustrated as a positive-pressure test type system wherein the prime mover is an electric motor driven impeller that operates to create positive pressure in the evaporative emission space under test. The pressure-responsive device is a pressure switch having a certain hysteresis in its switching characteristic. The electric-operated valve mechanism is a solenoid-operated valve that selectively opens and closes a flow path from the impeller to the evaporative emission space under test in a manner for performing the method that is the subject of the aforementioned commonly owned co-pending patent application Ser. No. 08/798,819, (Attorney Docket 97P7653US).

Speaking generally in another respect, the present invention relates to an engine-powered automotive vehicle evaporative emission control system comprising an evaporative emission space for containing volatile fuel vapors, and a leak detection system for detecting leakage from the evaporative emission space, wherein the leak detection system comprises: a prime mover for pumping gaseous fluid with respect to the evaporative emission space; a selectively operable valve assembly operates to allow the prime mover to pump gaseous fluid with respect to the evaporative emission space, to close the evaporative emission space and prevent the prime mover from pumping gaseous fluid with respect to the evaporative emission space upon attainment of an initial test pressure within the evaporative emission space that differs sufficiently from atmospheric pressure to allow a leak in the evaporative emission space to be detected, and which allows the prime mover to pump gaseous fluid with respect to the evaporative emission space at a pre-defined volumetric flow rate to rebuild pressure in the evaporative emission space to the initial test pressure when the pressure has changed from the initial test pressure by a pre-defined amount due to a leak in the evaporative emission space.

The foregoing, along with additional features, advantages, and benefits of the invention, will be seen in the ensuing description and claims which should be considered in conjunction with the accompanying drawings. The drawings disclose a presently preferred embodiment of the invention according to the best mode contemplated at this time for carrying out the invention.

DESCRIPTION OF THE PREFERRED EMBODIMENT

Figure 1:
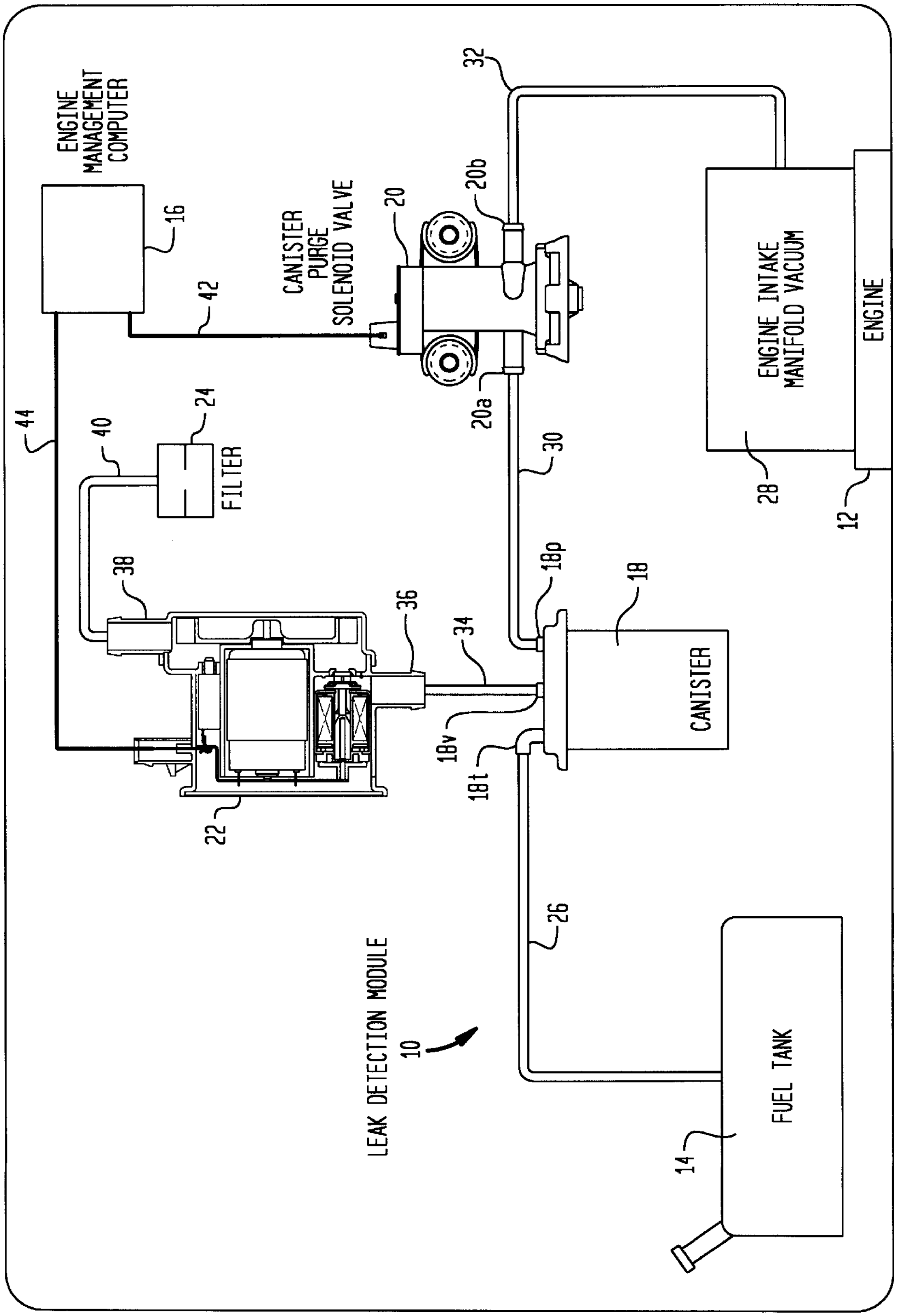
FIG. 1 is a general schematic diagram of an evaporative emission control system embodying principles of the present invention, including relevant portions of an automobile.

FIG. 1 shows an evaporative emission control (EEC) system 10 for an internal combustion engine powered automotive vehicle comprising in association with the vehicle's engine 12, a fuel tank 14, an engine management computer (EMC) 16, a conventional vapor collection canister (charcoal canister) 18, a canister purge solenoid (CPS) valve 20, a leak detection module (LDM) 22, and an air filter element 24.

The headspace of fuel tank 14 is placed in fluid communication with an inlet port 18*t* of canister 18 by means of a conduit 26 so that they cooperatively define evaporative emission space within which fuel vapors generated from the volatilization of fuel in tank 14 are temporarily confined and collected until purged to an intake manifold 28 of engine 12. A second conduit 30 fluid-connects an outlet port 18*p* of canister 18 with an inlet port 20*a* of CPS valve 20, while a third conduit 32 fluid-connects an outlet port 20*b* of CPS valve 20 with intake manifold 28. A fourth conduit 34 fluid-connects a vent port 18*v* of canister 18 with a first port 36 of LDM 22. LDM 22 also has a second port 38 that is communicated via a conduit 40 and filter element 24 to atmosphere.

EMC 16 receives a number of inputs (engine-related parameters for example) relevant to control of the engine and its associated systems, including EEC system 10. One electrical output port of EMC 16 controls CPS valve 20 via an electrical connection 42; other ports of EMC 16 are coupled with LDM 22 via electrical connections, depicted generally by the reference numeral 44 in FIG. 1.

From time to time, LDM 22 is commanded by EMC 16 to an active state as part of an occasional diagnostic procedure for confirming the integrity of EEC system 10 against leakage. During occurrences of such diagnostic procedure, EMC 16 commands CPS valve 20 to close. At times of engine running other than during such leak detection procedures, LDM 22 is inactive, but provides for a vent path from canister port 18*v* to be open to atmosphere. This vent path comprises conduit 34, LDM 22, conduit 38, conduit 40, and filter element 24. EMC 16 selectively operates CPS valve 20 such that CPS valve 20 opens under conditions conducive to purging and closes under conditions not conducive to purging. Thus, during times of operation of the automotive vehicle, the canister purge function is performed in the usual manner for the particular vehicle and engine so long as the leak detection diagnostic procedure is not being performed. When the leak detection diagnostic procedure is being performed, evaporative emission space 10 is closed so that it can be pressurized by LDM 22, as will be more fully explained hereinafter.

Figure 2:
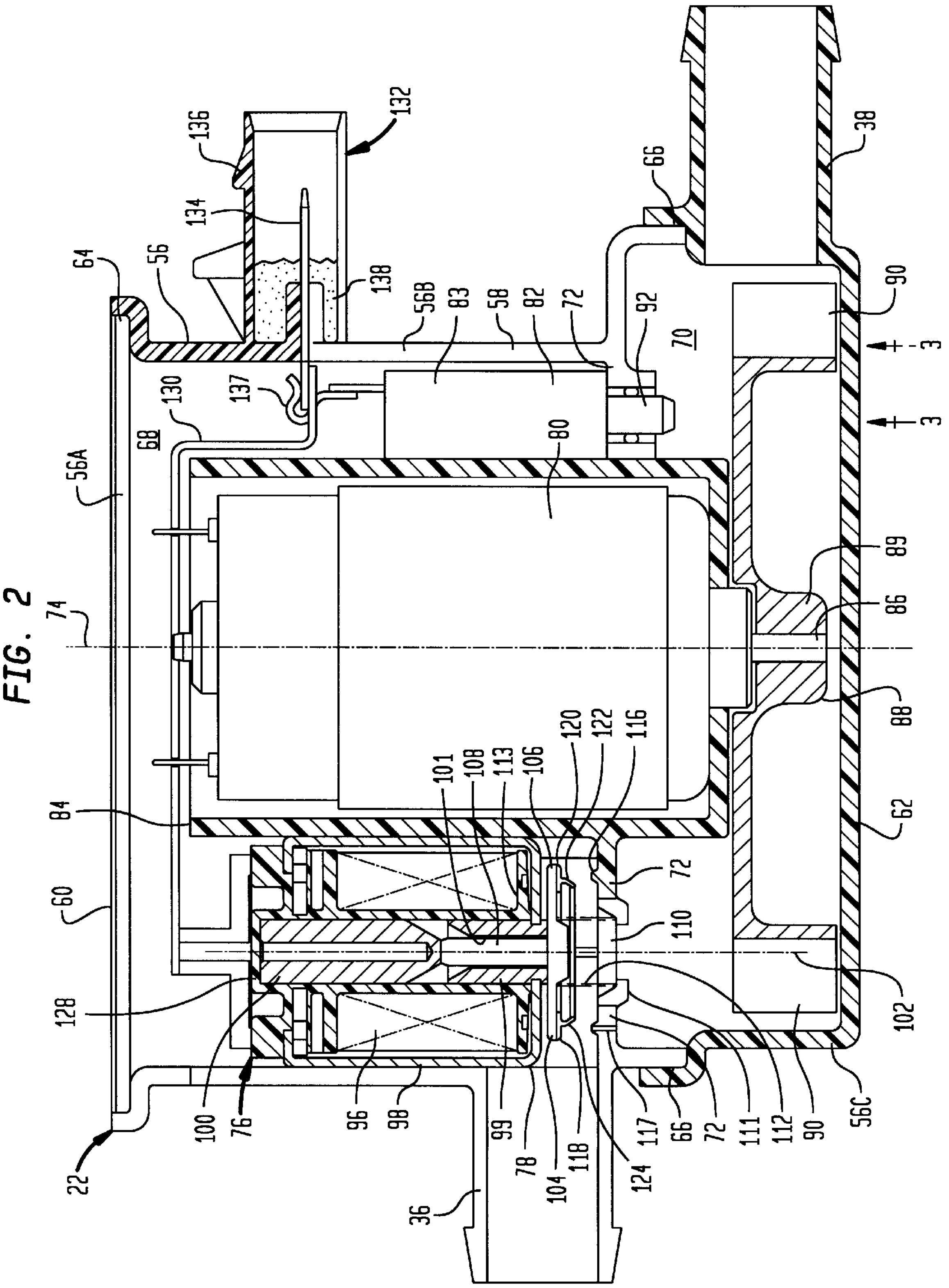
FIG. 2 is a longitudinal cross sectional view through one of the components of FIG. 1, by itself.
Figure 3:
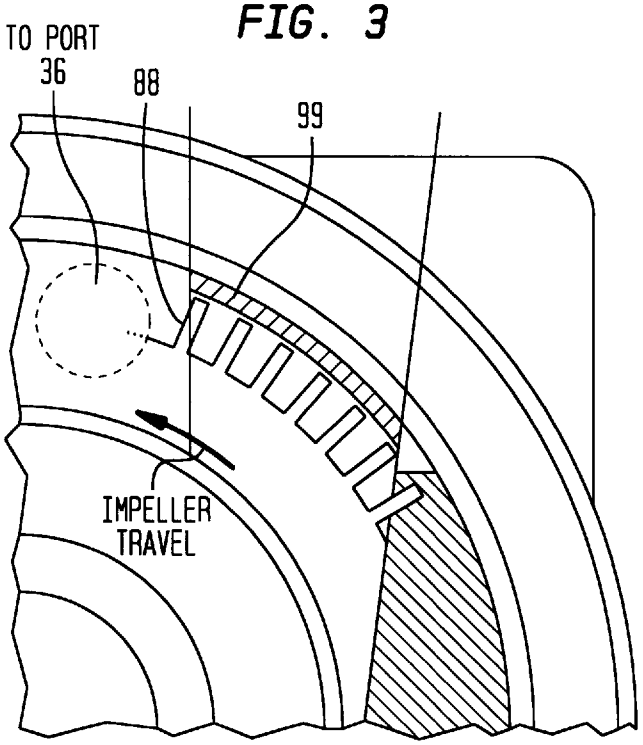
FIG. 3 is a fragmentary view in the direction of arrows 3—3 in FIG. 2 and is presented for illustrative purposes to show a feature that cannot be conveniently depicted in FIG. 2.

Attention is now directed to details of LDM 22 with reference to FIGS. 2 and 3. LDM 22 comprises a housing 56 composed of several housing parts 56A, 56B, and 56C assembled together, these parts preferably being suitable fuel-resistant plastic. In general housing 56 may be described as comprising a cylindrical side wall 58, although not necessarily circular nor of uniform cross section throughout, and opposite end walls 60 and 62. Housing part 56A essentially constitutes end wall 60 and is fitted and joined in any suitable gas-tight manner to the respective, otherwise open, end of housing part 56B at a joint 64. One portion of housing part 56C constitutes end wall 62, and another portion forms a portion of side wall 58. Housing part 56C is fitted and joined in any suitable gas-tight manner to the respective, otherwise open, end of housing part 56B at a joint 66.

Housing 56 encloses an internal space that is partitioned into a first chamber space 68 and a second chamber space 70 by an internal wall 72 that is integrally formed with housing part 58B. Reference numeral 74 designates an imaginary longitudinal axis, and it can be seen that wall 72 is disposed transverse to axis 74 so that chamber space 68 occupies the housing interior to one axial side of wall 72 while chamber space 70 occupies the housing interior to the other axial side of wall 72.

Chamber space 68 has external communication via port 36, which is illustratively disclosed as a nipple over which one end of conduit 34 can be fitted in gas-tight fashion. Chamber space 70 has external communication via port 38, which is illustratively disclosed as a nipple over which one end of conduit 40 can be fitted in gas-tight fashion. FIG. 2 should not be construed to imply that the two nipples are necessarily diametrically opposite each other, because the geometry of any particular LDM embodying principles of the present invention may be adapted to fit available installation space in a particular model of automotive vehicle.

Wall 72 is constructed and arranged to include integral features: that provide a mounting for an electric actuator 76 within housing 56; that cooperate with electric actuator 76 to form an electric actuated valve assembly 78 within housing 56; that provide a mounting for an electric motor 80, a D.C. motor in the disclosed embodiment for use with a automotive vehicle D.C. electric system, within housing 56; and that provide a mounting within housing 56 for an electric signaling device 82 that is responsive to pressure for supplying a pressure-related electric signal to EMC 16. The central region of wall 72 is formed with a walled receptacle 84 that is open toward the open end of housing part 56B onto which housing part 56A is fitted. Before housing part 56A is assembled to housing part 56B, electric actuator assembly 76, motor 80, and pressure-responsive device 82 are inserted through the open end of housing part 56B and securely lodged in any convenient manner in their respective mountings.

Motor mounting receptacle 84 and the housing of electric motor 80 are constructed and arranged such that the motor housing is stationarily mounted and the motor shaft axis is coincident with axis 74. At the very center of wall 72 there is a hole that allows a shaft 86 of motor 80 to protrude through the wall into chamber space 70 without interference. In order to avoid leakage between chamber spaces 68 and 70 through this hole, any suitable sealing means is provided between the motor housing and the motor receptacle around the hole. After motor 80 has been mounted, an impeller 88 is secured to motor shaft 86 by fastening a central hub 89 of the impeller onto the shaft before housing part 56C is assembled to housing part 56B. In the completed LDM 22, this serves to dispose impeller 88 within chamber space 70 for rotation about axis 74 when motor 80 is operated.

Impeller 88 comprises a number of vanes, or blades, 90 that are supported around its outer perimeter, much as in a paddle wheel. The radially outer edges of these vanes lie on a circle that is spaced slightly radially inward of a circumferentially surrounding portion of housing side wall 58 in part 56*c*. The vaned outer perimeter of impeller 88 may be considered to have opposite axial faces. One axial face closely confronts end wall 62 while the opposite face is spaced a somewhat larger distance from wall 72. The nipple that forms port 38 is substantially aligned with the outer perimeter of the vanes, and it projects radially outward of the housing at a certain circumferential location on housing side wall 58. The portion of the housing side wall that circumferentially surrounds impeller 88 has a nominally circular shape concentric with, but spaced from, the impeller perimeter.

So that impeller 88 will be effective for its intended purpose when operated by motor 80, a limited circumferential extent of housing side wall 58, and also of an adjoining portion of wall 72 that radially overlaps the vaned portion of the impeller, are shaped as intrusions that come sufficiently close to the vaned portion of the impeller, but without interference with the impeller, so as to create an air dam 99 when the impeller is operated by the electric motor. This air dam (FIG. 3) is located such that operation of the impeller is effective to draw air through port 38 and into chamber space 70, and thence impel the air out through port 36 so that pressurized air can be delivered from LDM 22, as will be more fully explained hereinafter. FIG. 3 shows a representative circumferential relation of ports 36 and 38 and the location of the intrusions formed in housing part 56B to create air dam 99. The area at port 38 is on the atmospheric pressure side of the impeller while port 36 is at the positive pressure side when the impeller operates.

A pressure switch that has a certain pre-defined hysteresis in its switching characteristic is particularly well-suited for use as pressure-responsive device 82. FIG. 2 shows the body 83 of such a pressure switch 82 disposed essentially entirely within chamber space 68. A nipple 92 projects in a sealed manner through a hole in wall 72 so as to expose a pressure sensing zone of pressure switch 82 to the pressure in chamber space 70 on the atmospheric side of the impeller. Switch 82 has a second pressure sensing zone exposed to chamber space 68. Switch 82 assumes a first switch state (open for example) so long as the pressure difference between its two sensing zones is less than a certain magnitude. When that magnitude is exceeded, the switch operates to a second switch state (closed for example). The switch possesses a certain hysteresis in its switching characteristic whereby it will switch back to its first state only when the magnitude of the pressure difference between its two sensing zones returns to a certain magnitude that is smaller by a predetermined amount than the magnitude at which it switched from its first state to its second state. As should be better appreciated as the description proceeds, the larger magnitude at which switching from first to second switch states occurs, corresponds to an upper regulating limit (URL), while the smaller magnitude at which switching from the second switch state back to the first switch occurs, corresponds to a lower regulating limit (LRL).

A solenoid actuator is a suitable device for electric actuator 76. Such a solenoid actuator 76 has a generally cylindrical shape for fitting securely within its mounting on the interior of housing 56. Actuator 76 comprises a bobbin-mounted electromagnetic coil 96 and an associated stator structure 98 composed of several ferromagnetic parts, including a stator part 99, to form a portion of the solenoid's magnetic circuit. A cylindrical ferromagnetic armature 100 cooperates with stator structure 98 to complete the magnetic circuit via air gaps between the stator structure and the armature. Armature 100 is arranged coaxial with a main axis 102 of actuator 76 and is guided for straight line motion along axis 102 within the bobbin that contains coil 96. A majority of the axial length of stator part 99 is fixedly disposed within the bore of the bobbin, and stator part 99 itself comprises a bore 101. As shown by FIG. 2, the confronting, complementary tapered, axial ends of armature 100 and stator part 99 are separated by an air gap of the magnetic circuit.

In addition to actuator 76, electric actuated valve assembly 78 comprises a mechanism which includes a non-ferromagnetic valve element 104 having a circular-shaped head 106 and a cylindrical stem 108. Head 106 and a confronting portion of wall 72 are constructed and arranged to form a selectively operable valve for selectively opening and closing a path of communication between chamber spaces 68 and 70.

The portion of wall 72 that confronts valve head 106 comprises a main through-hole 110 which includes a formation that provides a seat 111 for seating one end of a helical coiled compression spring 112. The other end of spring 112 is centered on the face of valve head 106 that confronts through-hole 110, fitting over a boss 113 formed in the valve head face. Spring 112 continuously biases the free end of valve stem 108 toward abutment with the tapered nose end of armature 100. In plan view, through-hole 110 is circular, and the portion of wall 72 that contains it also contains three protrusions 116 spaced a short distance radially outward of the through-hole's edge. These protrusions lie on a common circle concentric with through-hole 110, and they are equally spaced 120° apart along that circle. Each protrusion 116 is on the side of wall 72 toward valve head 106 and has a smooth domed shape, generally semi-spherical, as shown in cross section in FIG. 2. One of protrusions 116 contains a through-hole that forms a calibrated orifice 117 extending centrally through it and the underlying portion of wall 72, parallel to axis 102.

An annular one-piece sealing washer 118 that serves two purposes is disposed on the face of valve head 106 that confronts wall 72. Sealing washer 118 comprises a flat circular sealing ring 120 having a generally uniform thickness. One face of ring 120 is securely joined by any suitable means of attachment to valve head 106. The opposite face of ring 120 comprises an integral circular annular bead, or lip, 122. The juncture of lip 122 with ring 120 lies approximately midway between the inner and outer diameters of the ring. From there, lip 122 angles radially inwardly away from ring 120 to terminate in a free circular edge 124 that is spaced axially a certain distance from the ring. While lip 122 has a substantially stable shape, it allows for a slight degree of flexing.

FIG. 2 shows the fully open condition of valve assembly 78 that occurs when coil 96 is not being energized and impeller 88 not being operated by motor 80. In this condition, chamber spaces 68 and 70 are in common communication via through-holes 110 and orifice 117 because of the action of spring 112. The earlier-mentioned vent path to atmosphere that includes LDM 22 is also open because there is no significant flow restriction between ports 36 and 38. With coil 96 not being energized, the spring action biases valve element 104 away from wall 72 and protrusions 116 such that sealing washer 118 is forced away from, and out of contact with, wall 72 and protrusions 116. The spring force is transmitted through valve element 104 to force valve stem 108 more fully into actuator 76, causing both the far flat end of armature 100 to be forced against a stop wall 128 that is a part of actuator 76, and valve head 106 to be forced against the near end of stator part 99.

The extent to which valve element 104 is moved from the fully open condition of FIG. 2 toward wall 72 against the force of spring 112 is a function of the extent to which coil 96 is energized by electric current flow through it. Full energization of coil 96 causes valve assembly 78 to be fully closed, with sealing ring 120 being forced against the crowns of protrusions 116 to close orifice 117, and with edge 124 of lip 122 being forced against wall 72 with an accompanying slight degree of flexing to close through-hole 110. A certain energization of coil 96 that is less than full energization will lift valve element 104 sufficiently from the crowns of protrusions 116 to open orifice 117 while still keeping the free edge 124 of lip 122 against wall 72 to maintain closure of through-hole 110 although lip 122 will be flexed slightly less then when sealing washer 118 was closing both through-hole 110 and orifice 117.

A lead frame 130 provides for electric actuated valve assembly 78, electric motor 80, and electric pressure-responsive switch 82 to be electrically connected with external portions of associated electric circuitry that includes EMC 16. Lead frame 130 comprises: a first pair of conductive paths, each of which provides electric circuit continuity from a respective termination of coil 96 to an electric connector 132 that is available on the exterior of housing 56 for mating connection with a complementary wiring harness connector (not shown); a second pair of conductive paths, each of which provides electric circuit continuity from a respective terminal of motor 80 to connector 132; and a third pair of conductive paths, each of which provides electric circuit continuity from a respective terminal of switch 82 to connector 132.

Connector 132 comprises a number of terminals 134 which extend through the housing wall in a sealed manner. On the housing exterior these terminals are collectively laterally bounded by a surround 136 of the connector. If any of the conductive paths share a common electric potential (such as ground for example), it may be appropriate to integrate them so that there may be less than six terminals 134 within surround 136. The particular detailed construction of lead frame 130 and the location of connector 132 on housing 56 may depend on various design considerations for the particular vehicle in which LDM 22 is to be installed, and on manufacturing and assembly convenience. The lead frame may be assembled to electric actuated valve assembly 78, electric motor 80, and electric pressure-responsive switch 82 after these three components have been mounted within housing 56, or it may be assembled to these components earlier, with the united components 130, 78, 80, and 82 thereafter being assembled as a unit into the housing. The example of lead frame 130 disclosed in FIG. 2 shows that each conductive path that requires a terminal 134 possesses a feature 137 that allows for the respective terminal 134 to be inserted into engagement with it by inserting the terminal 134 through an opening in the housing wall. Hermetic sealing of terminals 134 to the housing wall may be accomplished by potting, an example of which comprises introducing encapsulation 138 into surround 136 while leaving the free ends of terminals 134 exposed for mating connection with respective terminals of the complementary wiring harness connector.

Now that the construction of an exemplary embodiment of LDM 22 has been described in detail, it is appropriate to explain its operation.

When no leak detection test is being performed, CPS valve 20 is operated by EMC 12 to periodically purge vapors from the canister and the tank headspace to engine 12. The exact scheduling of such purging is controlled by the vehicle manufacturer's requirements. A vent path to atmosphere through conduit 34, LDM 22, conduit 40, and filter element 24 is maintained open so that canister vent port 18*v* is communicated to atmosphere.

When a leak detection test is to be conducted on EEC system 10, CPS valve 20 is operated closed by EMC 16. EMC 16 also commands operation of motor 80 to rotate impeller 88. Electromagnetic coil 96 remains de-energized, causing valve assembly 78 to remain fully open. The operation of impeller 88 by motor 80 begins building pressure in the evaporative emission space comprising the tank, the canister, and any spaces, such as associated conduits, that are in communication therewith. Naturally all closures, such as the vehicle tank filler cap, must be in place to close the evaporative emission space under test. The sensing zone of switch 82 that is exposed to chamber space 68 is exposed to the pressure in the evaporative emission space because the construction of the mounting receptacle for electric actuator 76 and the actuator itself provide a path of communication from port 36 to chamber space 68. Although the remote location of switch 82 from the fuel tank is believed to provide a certain damping of pressure fluctuations without impairing accuracy for purposes of a test, this path of communication within housing 58 may also be used to provide damping, in a manner similar to that explained in the above-referenced patent application U.S. Ser. No. 08/798,818 (Attorney Docket 97P7652US).

If there are no conditions, such as a "pinched line" for example, that prevent a desired pre-defined test pressure from being created in the evaporative emission space within limits of a pre-defined initial pressurization time counted by EMC 16, switch 82 will eventually switch from its first state to its second state to signal that the pre-defined initial test pressure, corresponding to the URL programmed into EMC 16, has been reached. At that time, EMC 16 fully energizes coil 96 so as to cause valve assembly 78 to close both through-hole 110 and orifice 117 while motor 80 continues to operate impeller 88. If the evaporative emission space is completely fluid-tight, meaning no leaks, the URL will be maintained without loss during the length of the leak detection test time. The leak detection test time commences after coil 96 has been fully energized to fully close valve assembly 78.

Had the programmed URL not been attained within a programmed window that defines the allowable time to attain URL, a "pinched line" or "gross leak" would be indicated and the ensuing leak detection test aborted. Generally speaking, a "gross leak" will be indicated by the inability to reach URL within the maximum time allowed by the programmed window, and a "pinched line", by reaching the URL in a time less than the minimum time allowed by the programmed window. It is to be appreciated however that in any given configuration, the locations of the lines can affect these generalizations.

On the other hand, if there is neither a gross leak nor a pinched line, leakage from the defined evaporative emission space will cause the pressure to begin dropping from the URL toward the LRL that has also been programmed into EMC 16. When switch 82 detects that the LRL has been reached, it will switch back to its first state. Thus, the hysteresis in the switching characteristic of switch 82 provides pre-defined switch points that correspond to the URL and to the LRL.

Figure 4:
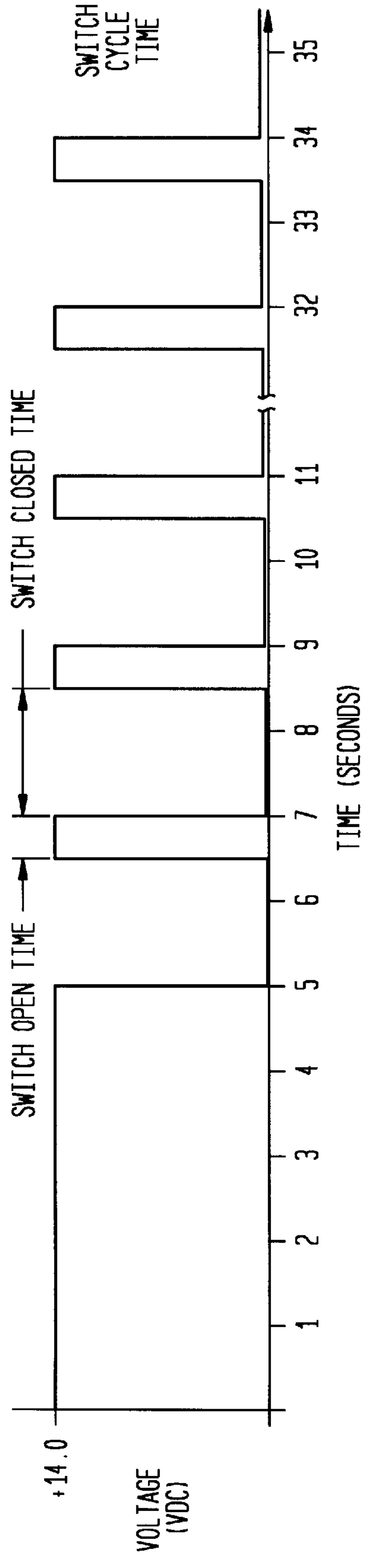
FIGS. 4, 5, and 6 are respective graph plots useful in understanding the inventive principles.
Figure 5:
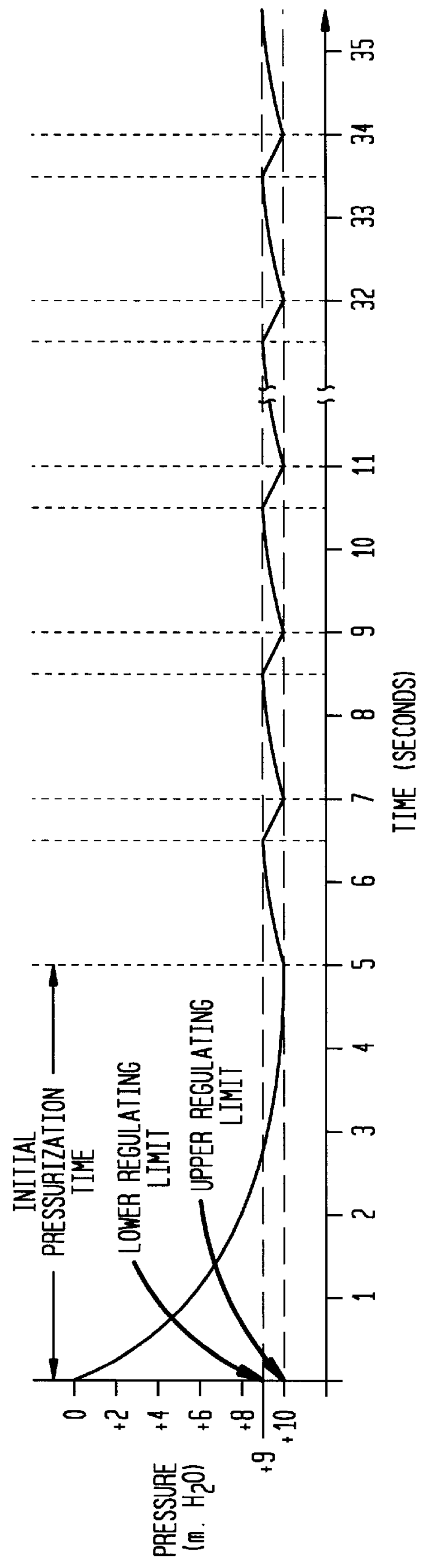

FIG. 5 shows an exemplary graph plot of pressure vs. time commencing at zero seconds and with the evaporative emission space pressure being initially at zero inches water relative to atmosphere. FIG. 4 shows the corresponding operating condition of switch 82. When the switch senses that URL has been reached, (five seconds in the example of FIGS. 4 and 5), it signals EMC 16 by switching from its first to its second state. EMC 16 then causes valve assembly 78 to be operated fully closed while motor 80 continues to run.

If a leak is present, pressure begins to be lost, as shown in FIG. 5 between 5.0 and 6.5 seconds. When the pressure reaches the LRL, the switching of switch 82 back to its first condition, rather than commanding valve assembly 78 to fully open so that both through-hole 110 and orifice 117 would be open, is processed by EMC 16 to command actuator 76 to operate to the condition where orifice 117 is opened while through-hole 110 remains closed. This capability is attained by the previously described construction of sealing washer 118, and the appropriate energization of coil 96. As a result, the impeller rebuilds pressure toward the URL but now by a controlled air flow bleed through orifice 117. Operation of impeller 88 provides a substantially constant head of pressure. When switch 82 detects that the URL has again been reached, as shown at 7.0 seconds in the FIG. 5 example, valve assembly 78 is again operated fully closed, re-closing orifice 117. As a result, it can be understood that switch 82 may cycle in a manner like that depicted by FIG. 5.

It can be appreciated that, for any given volume of liquid fuel in the tank, smaller leaks will result in longer intervals between switch 82 operating from its second state to its first state, and larger leaks, shorter intervals. Similarly, for that same given volume of liquid fuel in the tank, the rebuild time is related to leak size because leakage is occurring even while pressure is being rebuilt from LRL to URL.

Because the amount of liquid fuel in the fuel tank influences the volume of the tank headspace, and hence evaporative emission space volume, a tank with less liquid fuel will take longer to pressurize than one with more liquid fuel. Therefore, in order to obtain a proper measurement of effective leak size, the amount of liquid fuel in the tank must be eliminated as a factor. For a given volume of liquid fuel in the tank, the cycle time corresponds to the size of the leak path or paths.

EMC 16 monitors the duration of each successive switch condition, i.e. closed, open, closed, open, . . . etc. These data measurements are processed by the EMC in accordance with algorithms programmed into it. The system eliminates the liquid fuel volume as a factor by a correction algorithm, such as ratioing. For example, ratioing the length of time that switch 82 is in one of its conditions (second condition for example) to the length of time that switch 82 is in the other of its conditions (first condition for example) to establish a liquid fuel volume correction factor. Thus, for normalizing results of a leak detection test so that liquid fuel volume is factored out, it is most advantageous to measure both: a) a time interval required for pressure in the evaporative emission space to drop from the URL to the LRL; and b) a time interval required to restore the initial test pressure from the LRL to the URL. Various correction algorithms may be employed for various emission system configurations. But as noted above, certain forms of systems embodying certain of the inventive principles may achieve compliance with relevant regulations by measuring only one type of time interval.

Figure 6:
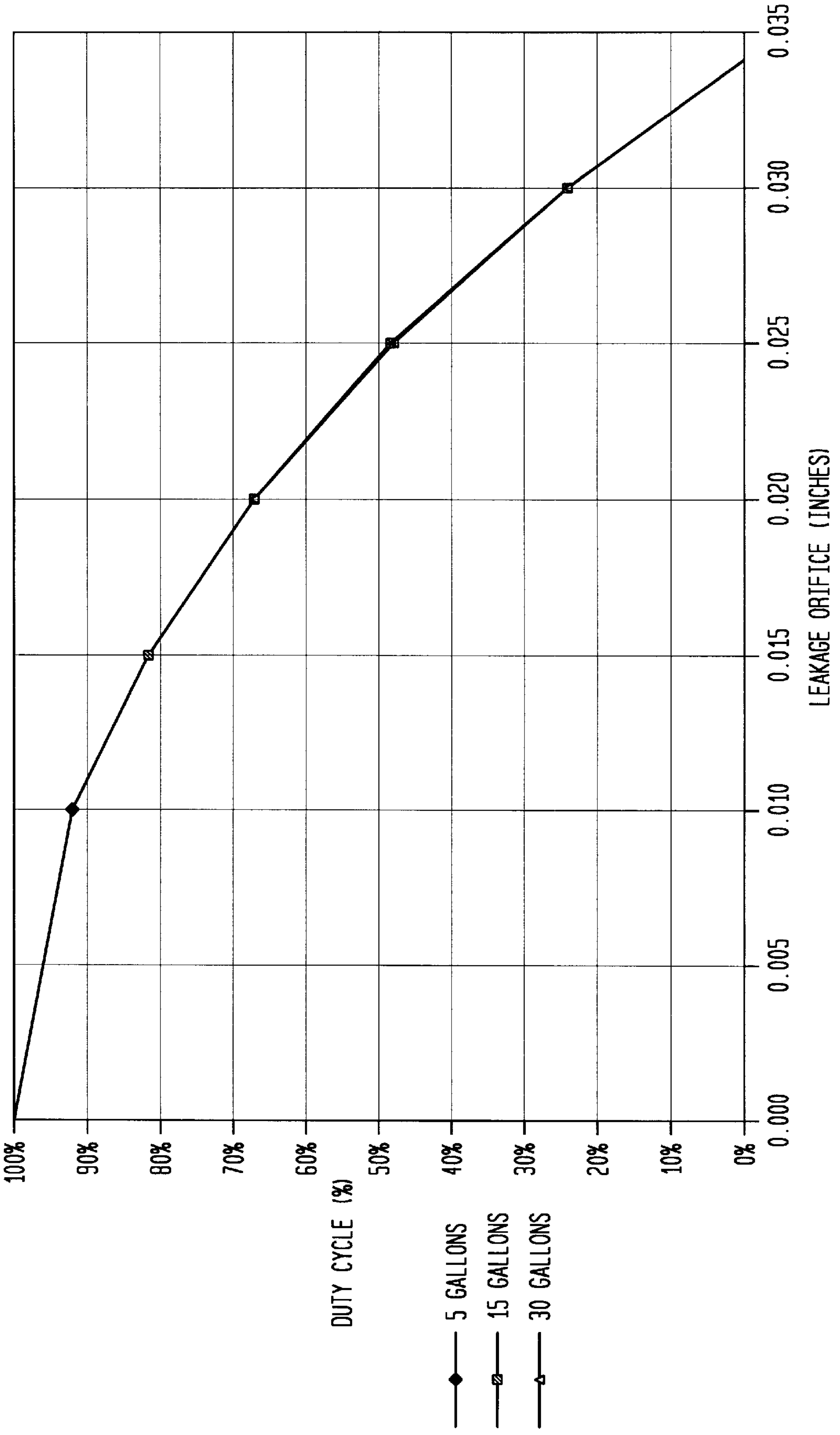

Perhaps the most appropriate algorithm will calculate effective leak size by an algorithm which ratios of the time that switch 82 is in its second state to the sum of the time that the switch is in its second state and the time that it is in its first state. By employing such an algorithm, the effect of liquid fuel volume is nulled out, as demonstrated by the exemplary, representative graph plots of FIG. 6, which correlate cycle time to leakage measured as the diameter of a circle whose area corresponds to the size of the total area of all leak paths.

In general, a test that shows a constant size leak will result in fairly consistent closed times and fairly consistent open times. For purposes of a test, it may be desirable to ignore one or more open and/or closed switch times to allow for initial stability of test results to be achieved. It may also be desirable to ignore any unusual aberration that may occur due to a spurious transient condition. For example, if, over a number of cycle times during a leak detection test, certain intervals are substantially identical except for perhaps one, that one may be deemed a disturbance that is to be ignored. Because both are related to leakage, either one or the other but preferably both types of intervals may be used by EMC 16 to determine the effective leak size by an appropriate algorithm. The correction for liquid fuel volume, such as by the ratioing discussed above, effectively normalizes the graph plot of any test to substantially eliminate liquid fuel volume as a test variable that could otherwise impair accuracy. Such correction may be done at any suitable time, or times, at the beginning of, during, and/or the end of a test.

Effectiveness of the inventive LDM 22 and system is predicated on reasonable stability of the pressurizing source, particularly while the pressure is being rebuilt from LRL to URL. This is advantageously accomplished by the motor-driven impeller 80, 88 and orifice 117 because the air that is forced through orifice 117 to rebuild the pressure from LRL back to URL, flows at a known volumetric rate due to the fact that impeller develops a substantially constant head of pressure and the fact that the orifice effect is present by appropriate sizing of the orifice.

Variation in tank fuel vapor pressure may affect test results by influencing the rate of change between the URL and LRL. A system, like the one described that positively pressurizes the evaporative emission space for a test, tends to inhibit fuel volatilization, and for practical purposes, it is believed that correction for such volatilization is unnecessary. However, if the inventive principles were to be incorporated into a negative pressurizing system, such pressurization would tend to promote fuel volatilization, and if volatilization were significant, correction might be appropriate. Such correction could comprise energizing coil 96 to fully close valve assembly 78 for a certain amount of time prior to beginning of pressurization, and then monitoring pressure in the evaporative emission space by a pressure sensor. From this, the rate of change in fuel vapor pressure in the headspace is calculated, and a correction made by a correction algorithm.

System considerations however suggest that positive pressurization is more robust and is to be preferred. For example, inaccuracies that might occur in an effective leak size measurement obtained with positive pressurization will tend toward disclosing a larger leak than is actually present while the opposite would be true of negative pressurization. Moreover, because negative pressurization draws vapor through the canister, canister saturation could result in undesired expulsion of fuel vapor to atmosphere.

Altitude variations can be corrected in vehicles that have MAP sensors because such sensors have the capability of approximating altitude. Correction is made by a suitable algorithm.

LDM 22 possesses a number of important advantages. Because the zone of switch 82 that senses pressure in chamber space 68 is physically disposed on the vent side of the flow path through canister 18, it is believed to be less sensitive to pressure fluctuations on the evaporative emission space side of the canister, thereby providing a degree of damping, while retaining accurate switching functionality. Use of LDM 22 in an evaporative emission control system reduces the number of connections, both electrical and fluid, that are required for its installation in a new vehicle in a vehicle assembly plant. Accordingly, less in-plant labor time is needed. Moreover, reliability is improved because fewer connections reduces the probability of a faulty connection with another system component. LDM is well-suited for mass-production fabrication, including the use of automated assembly techniques, thereby providing for cost-effective manufacture. Because a substantially unrestricted flow path exists through LDM 22 between ports 36 and 38 when through-hole 110 is not being closed by valve element 104 and sealing washer 118, venting of the canister vent port is inherently provided at times of non-operation of impeller 88, and it is therefore possible to avoid inclusion of a separate vent valve in the vent path that is closed when a leak detection test is being performed.

While a presently preferred embodiment of the invention has been illustrated and described, it should be appreciated that principles are applicable to other embodiments that fall within the scope of the following claims.

What is claimed is:

1. In an engine-powered automotive vehicle evaporative emission control system comprising an evaporative emission space for containing volatile fuel vapors, and a leak detection system for detecting leakage from the evaporative emission space, the improvement in said leak detection system which comprises:

a prime mover for pumping gaseous fluid with respect to the evaporative emission space;

a selectively operable valve assembly which operates to a first condition for allowing the prime mover to pump gaseous fluid with respect to the evaporative emission space, which operates to a second condition for closing the evaporative emission space upon attainment of an initial test pressure within the evaporative emission space that differs sufficiently from atmospheric pressure to allow a leak in the evaporative emission space to be detected, and which operates to a third condition different from its first and second conditions;

a control, including a pressure-responsive electric device, for controlling operation of the prime mover and the valve assembly;

wherein the pressure-responsive electric device is disposed to provide an electric signal related to pressure in the evaporative emission space;

wherein the pressure-responsive electric device allows the valve assembly to assume its first condition while the prime mover is operated to pressurize the evaporative emission space to an initial test pressure at the beginning of a test;

wherein a signal from the pressure-responsive device causes the valve assembly to assume its second condition upon attainment of the initial test pressure; and wherein a signal from the pressure-responsive device causes the valve assembly to assume its third condition when the initial test pressure has changed by a pre-defined amount due to a leak in the evaporative emission space.

2. The improvement set forth in claim 1 wherein the valve assembly comprises a main flow path and a secondary flow path, the effective flow area of the main flow path is larger than that of the secondary flow path, the valve assembly causes both main and secondary flow paths to be open to flow when assuming its first condition, the valve assembly causes the main and secondary flow paths to be closed to flow when assuming its second condition, and the valve assembly causes the main flow path to be closed to flow and the secondary flow path to be open to flow when assuming its third condition.

3. The improvement set forth in claim 2 wherein the control also causes the prime mover to pump gaseous fluid with respect to the evaporative emission space via the secondary flow path when the valve assembly is in its third condition.

4. The improvement set forth in claim 3 wherein the secondary flow path comprises at least one orifice that provides pre-defined, substantially constant, volumetric flow rate therethrough when the prime mover is operated while the valve assembly is in its third condition.

5. The improvement set forth in claim 4 wherein the prime mover comprises an impeller that is rotated by an electric motor.

6. The improvement set forth in claim 1 wherein the control comprises measuring means that is responsive to the pressure-responsive device for measuring at least one of: a) a time interval required for pressure in the evaporative emission space to change from the initial test pressure by the pre-defined amount due to a leak in the evaporative emission space; and b) a time interval required for the pressure in the evaporative emission space to be restored to the initial test pressure after having changed by the pre-defined amount due to a leak in the evaporative emission space.

7. The improvement set forth in claim 6 wherein the control comprises correction means for utilizing both measured time intervals to establish a correction factor for liquid fuel volume in the tank.

8. The improvement set forth in claim 7 wherein the correction means ratios the measured time intervals to establish a correction factor for liquid fuel volume in the tank.

9. The improvement set forth in claim 6 wherein the pressure-responsive device comprises a pressure-responsive switch that operates from a first state to a second state when the initial test pressure within the evaporative emission space is achieved, and that operates from the second state to the first state when the initial test pressure has changed by the pre-defined amount due to a leak in the evaporative emission space.

10. The improvement set forth in claim 9 wherein the measuring means measures at least one of: a) a time interval during which the switch is in its first state; and b) a time interval during which the switch is in its second state.

11. The improvement set forth in claim 10 wherein the control comprises correction means for ratioing both measured time intervals to establish a correction factor for liquid fuel volume in the tank.

12. The improvement set forth in claim 1 wherein the valve assembly comprises a valve mechanism comprising a main passage and at least one orifice passage for gaseous fluid pumped by the prime mover, the effective flow area of the main passage is sufficiently large to provide no orifice effect for flow pumped therethrough by the prime mover, the effective flow area of the at least one orifice passage is sufficiently small to provide an orifice effect for flow pumped therethrough by the prime mover, the valve assembly causes both main and orifice passages to be open to flow when assuming its first condition, the valve assembly causes both main and orifice passages to be closed to flow when assuming its second condition, and the valve assembly causes the main passage to be closed to flow and the at least one orifice passage to be open to flow when assuming its third condition.

13. The improvement set forth in claim 12 wherein the control also causes the prime mover to pump gaseous fluid with respect to the evaporative emission space via the at least one orifice passage when the valve assembly is in its third condition.

14. The improvement set forth in claim 12 wherein the valve assembly comprises a wall through which the main passage and the at least one orifice passage extend, a valve element, including a seal, confronting the main passage and the at least one orifice passage, and the valve element is selectively positionable with respect to the wall to selectively position the seal against the wall.

15. The improvement set forth in claim 14 wherein the main passage is disposed in substantial coaxial alignment with the selective positioning of the valve element along an axis, the at least one orifice passage is disposed radially spaced from the main passage, and the seal comprises a body disposed against a face of the valve element and having a sealing zone for selectively sealing the at least one orifice passage, and a sealing lip projecting from the seal body for selectively sealing the main passage.

16. The improvement set forth in claim 15 wherein the seal body comprises a sealing ring having an annular surface confronting the wall, the sealing lip projects radially inwardly and away from the sealing ring to terminate in a free circular edge, the wall comprises a raised annular ridge confronting the sealing ring annular surface, and the at least one orifice passage has an open end that is disposed on the raised annular ridge and that is closed when the sealing ring annular surface seats on the annular ridge.

17. The improvement set forth in claim 1 wherein the pressure-responsive device comprises a pressure-responsive switch that operates from a first state to a second state when the initial test pressure within the evaporative emission space is achieved, and that operates from the second state to the first state when the initial test pressure has changed by the pre-defined amount due to a leak in the evaporative emission space.

18. In an engine-powered automotive vehicle evaporative emission control system comprising an evaporative emission space for containing volatile fuel vapors, and a leak detection system for detecting leakage from the evaporative emission space, the improvement in said leak detection system which comprises:

a prime mover for pumping gaseous fluid with respect to the evaporative emission space;

a selectively operable valve assembly which is in series flow relationship with the prime mover and operates to allow the prime mover to pump gaseous fluid through the valve assembly with the respect to the evaporative emission space, to close the evaporative emission space and prevent the prime mover from pumping gaseous fluid with respect to the evaporative emission space upon attainment of an initial test pressure within the evaporative emission space that differs sufficiently from atmospheric pressure to allow a leak in the evaporative emission space to be detected, and which allows the prime mover to pump gaseous fluid through the valve assembly with respect to the evaporative emission space at a pre-defined volumetric flow rate to rebuild pressure in the evaporative emission space to the initial test pressure when the pressure has changed from the initial test pressure by a pre-defined amount due to a leak in the evaporative emission space.

19. The improvement set forth in claim 18 further comprising a control, including a pressure-responsive electric device, for controlling operation of the prime mover and the valve assembly; and wherein the pressure-responsive electric device is disposed to provide an electric signal related to pressure in the evaporative emission space.

20. The improvement set forth in claim 19 wherein the pressure-responsive device comprises a pressure-responsive switch that operates from a first state to a second state when the initial test pressure within the evaporative emission space is achieved, and that operates from the second state to the first state when the initial test pressure has changed by the pre-defined amount due to a leak in the evaporative emission space.

21. The improvement set forth in claim 18 in which the prime mover comprises an impeller pump that creates a pressure head, and the valve assembly comprises a fixed orifice to which the pressure head is applied to create the pre-defined volumetric flow rate for rebuilding pressure in the evaporative emission space to the initial test pressure.

22. A module for an on-board evaporative emission leak detection system that detects leakage from an evaporative emission space of a fuel system of an automotive vehicle, the module comprising:

a housing having an inlet port, an outlet port, and a flow path extending between the inlet port and the outlet port;

the housing containing a selectively operable pump disposed in the flow path and capable of causing flow in one direction along the flow path when in a pumping mode of operation; the pump being open to flow in both the one direction and an opposite direction when in a non-pumping mode;

the housing containing a selectively operable valve disposed in the flow path to block flow through the flow path when in a blocking mode and to pass flow through the flow path when in a passing mode; and the housing containing a sensor exposed to the flow path.

23. The module as set forth in claim 22 in which the sensor comprises a pressure sensor having plural pressure sensing ports, a first of which is communicated to the inlet port and a second of which is communicated to the outlet port.

24. The module set forth in claim 22 in which the pump and the valve are in series flow relationship with each other in the flow path.

25. The module as set forth in claim 24 in which the valve is disposed in the flow path between the pump and the outlet port.

26. A module for an on-board evaporative emission leak detection system that detects leakage from an evaporative emission space of a fuel system of an automotive vehicle, the module comprising:

a housing having an inlet port, an outlet port, and a flow path between the inlet port and the outlet port;

a selectively operable pump assembly that is disposed in the flow path;

a selectively operable valve assembly that is disposed in the flow path;

each of the pump assembly and the valve assembly comprising a respective electric device for operating the respective assembly, the housing comprising plural receptacles disposed side-by-side and having spaced apart parallel axes, the electric device for the pump assembly being disposed coaxially in a first of the receptacles and the electric device for the valve assembly being disposed coaxially in a second of the receptacles; and the housing comprising plural housing parts that are in assembly relationship to cooperatively define the first and second receptacles and enclose the pump and valve assemblies within the housing.

27. A module for an on-board evaporative emission leak detection system that detects leakage from an evaporative emission space of a fuel system of an automotive vehicle, the assembly comprising:

a housing having an inlet port, an outlet port, and a flow path between the inlet port and the outlet port;

a selectively operable pump assembly that is disposed in the flow path;

a selectively operable valve assembly that is disposed is the flow path;

each of the pump assembly and the valve assembly comprising a respective electric device for operating the respective assembly, the housing comprising plural receptacles having spaced apart parallel axes, the electric device for the pump assembly being disposed coaxially in a second of the receptacles and the electric device for the valve assembly being disposed coaxially in a second of the receptacles; and the housing comprising plural housing parts that are in assembly relationship to cooperatively define the first and second receptacle and enclose the pump and valve assemblies within the housing, the housing comprising a third receptacle, and including a sensor disposed within the third receptacle and fluid-communication to the flow path.

* * * * *